United States Patent
Dharanipragada et al.

(10) Patent No.: US 6,470,314 B1
(45) Date of Patent: Oct. 22, 2002

(54) METHOD AND APPARATUS FOR RAPID ADAPT VIA CUMULATIVE DISTRIBUTION FUNCTION MATCHING FOR CONTINUOUS SPEECH

(75) Inventors: Satyanarayana Dharanipragada, Ossining; Mukund Padmanabhan, White Plains, both of NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/543,794

(22) Filed: Apr. 6, 2000

(51) Int. Cl.[7] .................. G10L 15/02; G10L 15/08; G10L 15/12; G10L 15/06
(52) U.S. Cl. .................. 704/231; 704/236; 704/239; 704/243
(58) Field of Search .................. 704/230–233, 704/254–256, 9, 246, 239, 243

(56) References Cited

U.S. PATENT DOCUMENTS

| | | | | | |
|---|---|---|---|---|---|
| 4,897,878 | A | * | 1/1990 | Boll et al. | 704/233 |
| 5,548,647 | A | * | 8/1996 | Naik et al. | 704/246 |
| 5,864,810 | A | * | 1/1999 | Digalakis et al. | 704/256 |
| 6,026,359 | A | * | 2/2000 | Yamaguchi et al. | 704/256 |
| 6,151,574 | A | * | 11/2000 | Lee et al. | 704/256 |
| 6,230,125 | B1 | * | 5/2001 | Vainio | 704/230 |
| 6,263,334 | B1 | * | 7/2001 | Fayyad et al. | 704/9 |

OTHER PUBLICATIONS

Bellegarda et al ("Robust Speaker Adaptation using a Piecewise Linear Acoustic Mapping", 1992 IEEE International Conference on Acoustics, Speech, and Signal Processing, Mar. 1992 pp. 445–448 vol. 1).*

Reynolds et al ("The Effects Of Telephone Transmission Degradations On Speaker Recognition Performance", 1995 International Conference on Acoustics, Speech, and Signal Processing, May 1995).*

Yuk et al ("Telephone Speech Recognition Using Neural Networks And Hidden Markov Models", 1999 IEEE International Conference on Acoustics, Speech, and Signal Processing, Mar. 1999).*

A. Sankar, "A Maximum–Likelihood Approach to Stochastic Matching for Robust Speech Recognition," IEEE Transactions on Speech and Audio Processing, vol. 4, No. 3, pp. 190–202, 1996.

C.J. Leggetter et al., "Maximum Likelihood Linear Regression for Speaker Adaptation of Continuous Density Hidden Markov Models," Computer Speech and Language, Academic Press Limited, pp. 173–185, 1995.

L. Neumeyer et al., "Probabilistic Optimum Filtering for Robust Speech Recognition," IEEE, pp. I–417–I–420, 1994.

F–H. Liu et al., "Efficient Joint Compensation of Speech for the Effects of Additive Noise and Linear Filtering," ICASSP, 4 pages, 1992.

* cited by examiner

*Primary Examiner*—Richemond Dorvil
*Assistant Examiner*—Daniel Nolan
(74) *Attorney, Agent, or Firm*—Paul J. Otterstedt; Ryan, Mason & Lewis, LLP

(57) ABSTRACT

A method of adapting a speech recognition system to one or more acoustic conditions comprises the steps of: (i) computing cumulative distribution functions based on dimensions of speech vectors associated with training speech data provided to the speech recognition system; (ii) computing cumulative distribution functions based on dimensions of speech vectors associated with test speech data provided to the speech recognition system; (iii) computing a nonlinear transformation mapping based on the cumulative distribution functions associated with the training speech data and the cumulative distribution functions associated with the test speech data; and (iv) applying the nonlinear transformation mapping to speech vectors associated with the test speech data prior to recognition, wherein the speech vectors transformed in accordance with the nonlinear transformation mapping are substantially similar to speech vectors associated with the training speech data.

37 Claims, 2 Drawing Sheets

METHOD AND APPARATUS FOR RAPID ADAPT VIA CUMULATIVE DISTRIBUTION FUNCTION MATCHING FOR CONTINUOUS SPEECH

FIELD OF THE INVENTION

The present invention relates generally to speech recognition systems and, more particularly, to methods and apparatus for rapidly adapting such speech recognition systems to new acoustic conditions via cumulative distribution function matching techniques.

BACKGROUND OF THE INVENTION

A real-world speech recognition system encounters several acoustic conditions in the course of its application. For instance, a speech recognition system that handles telephony transactions can be reached through a regular handset, a cellular phone or a speakerphone. Each represents a different acoustic environment. Currently, it is well known that a system trained only for a particular acoustic condition degrades drastically when it encounters a different acoustic condition. To avoid this problem, one normally trains a system with data representing all the possible acoustic environments. However, it is often difficult to anticipate all the different acoustic and channel conditions and, moreover, such a pooled system often becomes too large and, hence, computationally burdensome.

Earlier techniques to adapt the acoustic models to a specific environment may be roughly classified into "model transformation" and "feature space transformation" techniques. In these techniques, the test utterance is first decoded with a generic speaker independent system (first pass), and the transcription with errors is used to compute the extent of the mismatch between the generic model and the specific environment.

A specific example of "model transformation" is MLLR (Maximum Likelihood Linear Regression) as described in C. J. Legetter and P. C. Woodland, "Speaker Adaptation of Continuous Density HMM's Using Multivariate Linear Regression," ICSLP 1994, pp. 451–454, the disclosure of which is incorporated by reference herein. MLLR is based on the assumption that the model that is most suitable for transcribing the test speech is related to the generic model by means of a linear transform, i.e., the means and covariances of the gaussians in the transformed model are related to the means and covariances of the gaussians in the generic model by a linear transform. The parameters of the transformation are computed so that the likelihood of the test speech is maximized with the use of the transformed system, and assuming that the first pass transcription is the correct transcription of the test speech.

In "feature space transformation" techniques, the feature space of the test utterance is assumed to be related to the generic feature space through a linear transformation, and the linear transformation is computed, as before, to maximize the likelihood of the test speech under the assumption that the first pass transcription is correct, see, e.g., A. Sankar and C. H. Lee, "A Maximum-likelihood Approach to Stochastic Matching for Robust Speech Recognition," IEEE Trans., ASSP, 1995, the disclosure of which is incorporated by reference herein.

Other techniques to implement "feature space transformation" also exist, for example, see L. Neumeyer and M. Weintraub, "Probabilistic Optimum Filtering for Robust Speech Recognition," ICASSP, 1994, pp. 417–420; and F. H. Liu, A. Acero and R. M. Stern, "Efficient Joint Compensation of Speech for the Effect of Additive Noise and Linear Filtering," ICASSP, 1992, the disclosures of which are incorporated by reference herein. These techniques do not require a first pass decoding, but they do have the computational overhead of vector quantizing the acoustic space, and finding the center that is closest to each test feature vector.

SUMMARY OF THE INVENTION

The present invention provides rapid, computationally inexpensive, nonlinear transformation methods and apparatus for adaptation of speech recognition systems to new acoustic conditions. The methodologies of the present invention may be considered as falling under the category of "feature space transformation" techniques. Such inventive techniques have the advantage of being computationally much less inexpensive than the conventional techniques described above as the techniques of the invention do not require a first pass decoding or a vector quantization computation.

Generally, the invention provides equalization via cumulative distribution function matching between training acoustic data and test acoustic data. The acoustic data is preferably in the form of cepstral vectors, although spectral vectors or even raw speech samples may be used. The present invention represents a more powerful and flexible transformation as the mapping of the test feature to the space of the training features is not constrained to be linear.

In an illustrative aspect of the invention, a method of adapting a speech recognition system to one or more acoustic conditions, the method comprising the steps of: (i) computing cumulative distribution functions based on dimensions of speech vectors associated with training speech data provided to the speech recognition system; (ii) computing cumulative distribution functions based on dimensions of speech vectors associated with test speech data provided to the speech recognition system; (iii) computing a nonlinear transformation mapping based on the cumulative distribution functions associated with the training speech data and the cumulative distribution functions associated with the test speech data; and (iv) applying the nonlinear transformation mapping to speech vectors associated with the test speech data prior to recognition, wherein the speech vectors transformed in accordance with the nonlinear transformation mapping are substantially similar to speech vectors associated with the training speech data.

These and other objects, features and advantages of the present invention will become apparent from the following detailed description of illustrative embodiments thereof, which is to be read in connection with the accompanying drawings.

DETAILED DESCRIPTION OF PREFERRED EMBODIMENTS

The present invention will be explained below in the context of an illustrative continuous speech recognition system. However, it is to be understood that the present invention is not limited to this or any particular speech recognition system. Rather, the invention is more generally applicable to any suitable speech recognition system in which it is desirable to realize increased recognition performance via improved feature space transformation based adaptation techniques. By way of example only, generalized speech recognition systems such as the commercially available large vocabulary IBM ViaVoice or ViaVoice Gold systems (trademarks of IBM Corporation of Armonk, N.Y.) may be adapted to permit and/or perform feature space transformation in accordance with the invention.

Figure 1:
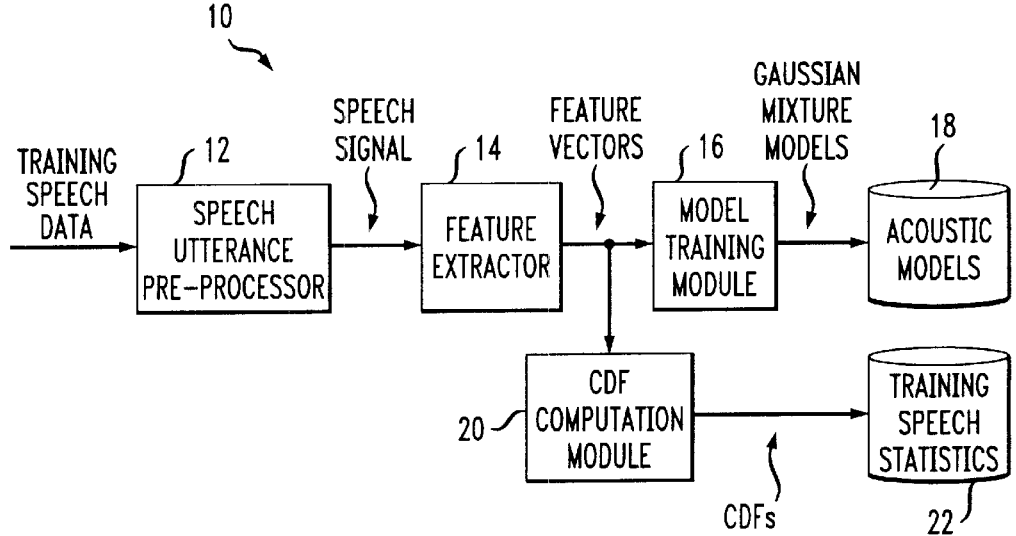
FIG. 1 is a block diagram of an illustrative continuous speech recognition system in a training mode according to one embodiment of the present invention.
Figure 2:
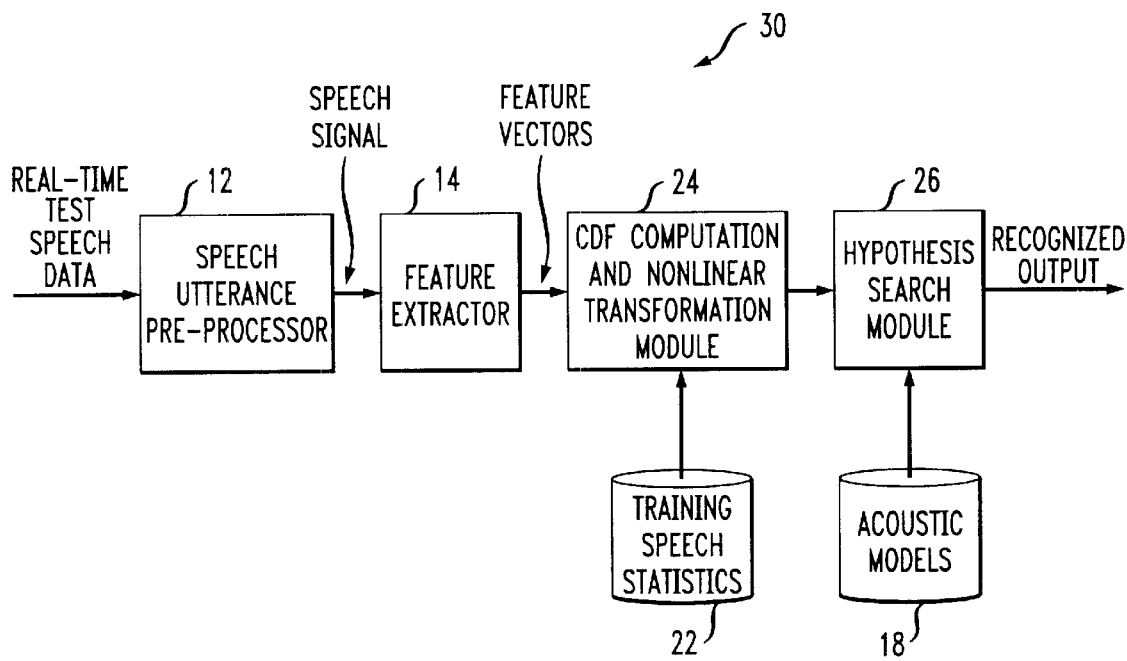
FIG. 2 is a block diagram of an illustrative continuous speech recognition system in a real-time recognition mode according to one embodiment of the present invention.

Before explaining an illustrative adaptation methodology of the invention, a brief explanation of the functionality of the components of an illustrative continuous speech recognition system employing adaptation via feature space transformation in accordance with the invention will now be given. FIG. 1 depicts the system in a training mode, while FIG. 2 depicts the system in a real-time recognition mode.

Referring initially to FIG. 1, a block diagram is shown of an illustrative continuous speech recognition system for training acoustic models and computing training cumulative distribution functions in accordance with the invention. The system 10, in a training mode, comprises front-end processing components including a speech utterance pre-processor 12 and a feature extractor 14. The system also comprises a model training module 16 and an acoustic model store 18. The speech recognition system uses training data to train acoustic models which are used during real-time decoding operations. Further, the system includes a cumulative distribution function (CDF) computation module 20 and a training speech statistics store 22, as will be explained below.

The speech utterance pre-processor 12 receives training speech data and generates representative speech waveforms, i.e., a speech signal. The speech utterance pre-processor 12 may include, for example, an audio-to-analog transducer (microphone) and an analog-to-digital converter which respectively transduce the utterances into an electrical signal and then convert the electrical signal into a digital signal representative of the speech uttered. Further, the pre-processor may sample the speech signal and partition the signal into overlapping frames so that each frame is discretely processed by the remainder of the system. The output signal of the pre-processor 12 is the sampled speech waveforms or speech signal which is recorded and provided to a feature extractor 14.

The feature extractor 14 receives the speech signal and, as is known in the art, extracts cepstral features from the signal at regular intervals, for example, about every 10 milliseconds. The cepstral features are in the form of feature or speech vectors (signals) which are then passed on to a model training module 16. As is also known in the art, the speech vectors representing the training data are used to train acoustic models such as, for example, gaussian mixture models, which are then used by the system to decode speech data received during the course of a real-time application. These models are stored in acoustic models store 18.

In addition, the speech vectors output by the feature extractor 14 are provided to the CDF computation module 20. As will be explained in detail below in the context of FIG. 4, the CDF computation module 20, using the training cepstral vectors, computes a cumulative distribution function for each cepstral dimension i. The function may be represented as $F_T^i$. The CDFs are then stored in the training speech statistics store 22 for use during real-time recognition.

Referring now to FIG. 2, the continuous speech recognition system is depicted in a real-time recognition mode in accordance with the invention. The system 30 comprises front-end processing components including the speech utterance pre-processor 12 and the feature extractor 14, and the acoustic models store 18 and the training speech statistics store 22. These are the same components of the system mentioned above in the training mode. Additionally, the system comprises a CDF computation and nonlinear transformation module 24 and a hypothesis search module 26.

The front-end processing components performs similar operations as mentioned above except, in this case, it is on test speech data provided by a user, for example, speech data associated with a telephony application. Speech vectors associated with at least a portion of the test speech data are output by the feature extractor 14 and provided to the CDF computation and nonlinear transformation module 24. These speech vectors are referred to as adaptation speech vectors. As will be explained in detail below in the context of FIG. 4, the module 24, using the adaptation vectors, computes a cumulative distribution function for each cepstral diminution i. The function may be represented as $F_A^i$. Then, for each dimension i, using $F_T^i$ from the training speech statistics store 22 and $F_A^i$, the module 24 finds a mapping $\phi_i$ such that the CDF computed with the mapped test data is identical to the training CDF, $F_T^i$. The map is applied to each dimension i of the test speech vectors to form transformed vectors. Advantageously, the transformation provided by the map brings the test speech vectors cepstrally (or spectrally) close to (i.e., substantially matching or similar to) the speech vectors encountered during training.

The transformed speech vectors are then provided to the hypothesis search module 26. As is known, the hypothesis search routine performed by the module 26 is substantially controlled by four components: (i) an acoustic vocabulary (not shown); (ii) a language model vocabulary (not shown); (iii) acoustic models 18; and (iv) a language model (not shown). Specifically, the hypothesis search routine hypothesizes a sequence of words from the acoustic vocabulary and computes a score for the hypothesis. Subsequently, the hypothesis with the best score is output as the recognized or decoded sequence. The process of computing the score consists of two steps: (i) computing an acoustic model score; and (ii) computing a language model score. The language model score is related to linguistic constraints and tries to capture the grammatical constraints in the particular language. The acoustic model score relates to the probability distribution of the speech vectors for a given hypothesis. The probability of a sequence of speech vectors is computed using a parameterized probability density function (i.e., gaussians), and this constitutes the acoustic model score. The acoustic and language vocabularies define the words that can be used to construct the hypothesis. It is to be appreciated that by transforming the test speech vectors, such that they are cepstrally (or spectrally) close to the speech vectors encountered during training, a significant improvement in the recognition accuracy of the hypothesis search module is realized, especially in the presence of a change in acoustic conditions between the training mode and the real-time recognition mode.

Figure 3:
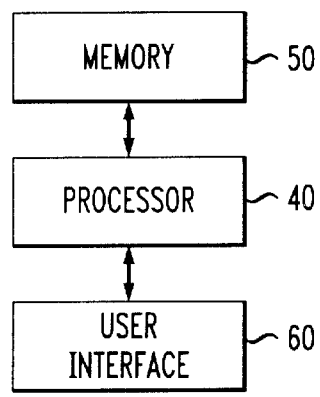
FIG. 3 is a block diagram of an illustrative hardware implementation of a speech recognition system in a training mode or a real-time recognition mode according to one embodiment of the present invention.

Referring now to FIG. 3, a block diagram of an illustrative hardware implementation of a speech recognition system employing feature space transformation according to the invention (e.g., as illustrated in FIGS. 1 and 2) is shown. In this particular implementation, a processor 40 for controlling and performing training, feature space transformation and speech decoding is coupled to a memory 50 and a user interface 60. It is to be appreciated that the term "processor" as used herein is intended to include any processing device, such as, for example, one that includes a CPU (central processing unit) or other suitable processing circuitry. For example, the processor may be a digital signal processor, as is known in the art. Also the term "processor" may refer to more than one individual processor. The term "memory" as used herein is intended to include memory associated with a processor or CPU, such as, for example, RAM, ROM, a fixed memory device (e.g., hard drive), a removable memory device (e.g., diskette), flash memory, etc. In addition, the term "user interface" as used herein is intended to include, for example, one or more input devices, e.g., keyboard, for inputting data to the processing unit, and/or one or more output devices, e.g., CRT display and/or printer, for providing results associated with the processing unit. The user interface 60 may also include a portion of the speech utterance pre-processor 12 (FIGS. 1 and 2) such as the microphone for receiving user speech.

Accordingly, computer software including instructions or code for performing the methodologies of the invention, as described herein, may be stored in one or more of the associated memory devices (e.g., ROM, fixed or removable memory) and, when ready to be utilized, loaded in part or in whole (e.g., into RAM) and executed by a CPU. In any case, it should be understood that the elements illustrated in FIGS. 1 and 2 may be implemented in various forms of hardware, software, or combinations thereof, e.g., one or more digital signal processors with associated memory, application specific integrated circuit(s), functional circuitry, one or more appropriately programmed general purpose digital computers with associated memory, etc. Given the teachings of the invention provided herein, one of ordinary skill in the related art will be able to contemplate other implementations of the elements of the invention.

Given the above-described illustrative speech recognition system, an illustrative method of performing adaptation, via feature space transformation according to the invention, in a speech recognition system will now be explained.

Figure 4:
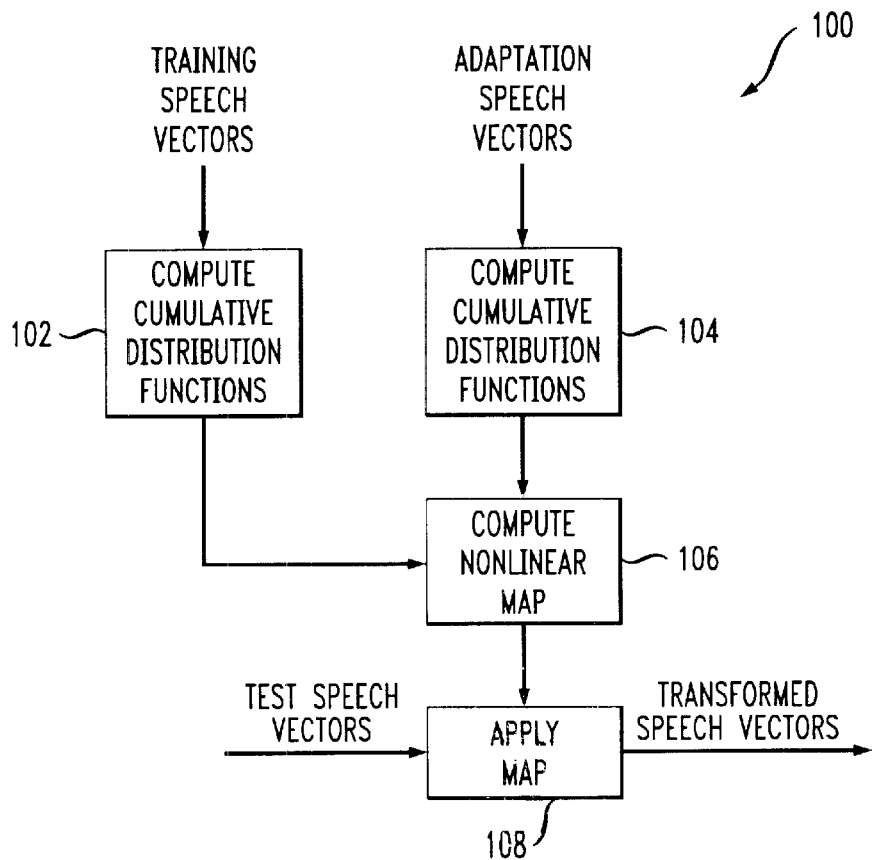
FIG. 4 is a flow diagram of an illustrative feature space transformation based adaptation methodology according to one embodiment of the present invention.

Referring now to FIG. 4, a flow diagram of an illustrative adaptation methodology according to the invention is shown. It is to be appreciated that such an adaptation methodology may be performed in accordance with the CDF computation module 20 (the training mode) of FIG. 1 and the CDF computation and nonlinear transformation module 24 (the real-time recognition mode) of FIG. 2.

Thus, in the methodology 100 shown in FIG. 4, step 102 is the training CDF computation step, which is performed in the training mode (e.g., by the CDF computation module 20). In this step, each dimension of each training speech vector is considered independently. Therefore, the subscript i will be dropped for the ease of notation. First, the maximum and minimum value across the whole training set, $x_{max}$ and $x_{min}$, are determined for each dimension. The range, $[x_{min}, x_{max}]$, is divided uniformly into M non-overlapping intervals or bins (usually equally spaced and typically about 10,000 in number); $x_{min}=b_1<b_2< \ldots b_{M-1}=x_{max}$ and bin $B_i=[b_i, b_{i-1}]$. Next, a histogram is constructed on these bins using the entire training data set. To do this, the entire training data is scanned and the number of samples that fall in each bin is determined. Let $n_i$ be the number of samples in bin $B_i$ and N be the total number of samples, i.e., the training data size. The probability of x being in bin $B_i$ is approximated by:

$$P(x \in B_i) = \frac{n_i}{N}. \tag{1}$$

Furthermore, for any $x \in B_i$, the cumulative distribution function is approximated by:

$$F_T(x : x \in B_i) = \sum_{j=1}^{i} \frac{n_j}{N}. \tag{2}$$

which is a piece-wise linear function approximation of the true distribution function. As mentioned above, the training CDFs are then stored for use during real-time mode.

Step 104 is the adaptation CDF ($F_A$) computation step, which is performed in the real-time mode (e.g., by module 24). This step is identical to step 102, except the computation is done on the adaptation speech vectors.

In the event of fewer data adaptation samples (e.g., insufficient adaptation data), a parametric density form (e.g., a mixture of gaussians) may be used to estimate the true distribution functions. Of course, when sufficient adaptation data is available, the nonparametric histogram approach described above (steps 102 and 104) is used.

Step 106 is the nonlinear map computation step, which is also performed in the real-time mode (e.g., by module 24). The objective of the map is to transform each dimension of the new (adaptation) vectors in such a way that the CDF constructed using the transformed data is identical to the training CDF (computed in step 102). This transformation can be described mathematically as:

$$\phi=(F_T)^{-1}F_A. \tag{3}$$

Accordingly, the mapping represents the product of the multiplication of $F_A$ and the inverse of $F_T$. To efficiently implement this mapping, the computations are organized as follows. First, two table $(x_T^k, f_T^k)$ and $(x_A^k, f_A^k)$ are constructed from $F_T$ and $F_A$, respectively, in such a way that $f_T^k$ and $f_A^k$ take on values in [0,1] in equal increments (typically 1000 increments). It is to be appreciated that $x_T$ are the training samples, $x_A$ are the adaptation samples, $f_T$ are the training functions, $f_A$ are the adaptation functions and k refers to the $k^{th}$ increment. The nonlinear map $\phi$ is now readily available as the table $(x_A^k, x_T^k)$. Therefore, given any test value x, a simple binary search is conducted on $x_A^k$ and the corresponding $x_T^k$ is retrieved as $\phi(x)$.

Step 108 is the map application or feature transformation step, which is also performed in the real-time mode (e.g., by module 24). The mappings, $\{\phi_i\}_{i}^{d}=1$, computed in step 106, are applied to each input speech vector before sending the vector to the recognition engine, i.e., the hypothesis search module 26. Thus, if $\underline{x}=[x_1 \ldots x_d]$ is the original speech vector, then the transformed vector is obtained as:

$$\underline{y}=\phi(\underline{x})=[\phi_1(x_1) \ldots \phi_d(x_d)]. \tag{4}$$

It is to be appreciated that, in the above illustrative embodiments, each dimension of the speech vector is considered independently for technical and computational ease. However, the invention is not limited to this restriction. Alternatively, by way of example, a nonlinear multidimensional map which maps a multidimensional test CDF to a multidimensional training CDF may be employed.

The methodology described above was evaluated on a continuous speech recognition system trained on telephone quality speech collected using a handset and tested on speech collected using a speaker phone. An average relative improvement in word error rate of approximately 33 percent was observed with the adaptation methodology of the present invention.

Further, it is to be appreciated that the methodology described above may be combined with one or more model based adaptation techniques and/or one or more other feature based transformation adaptation techniques.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

What is claimed is:

1. A method of adapting a speech recognition system to one or more acoustic conditions, the method comprising the steps of:
   computing cumulative distribution functions based on dimensions of speech vectors associated with training speech data provided to the speech recognition system;
   computing cumulative distribution functions based on dimensions of speech vectors associated with test speech data provided to the speech recognition system;
   computing a nonlinear transformation mapping based on the cumulative distribution functions associated with the training speech data and the cumulative distribution functions associated with the test speech data; and
   applying the nonlinear transformation mapping to speech vectors associated with the test speech data prior to recognition, wherein the speech vectors transformed in accordance with the nonlinear transformation mapping are substantially similar to speech vectors associated with the training speech data.

2. The method of claim 1, wherein the step of computing the cumulative distribution functions associated with the training speech data further comprises the step of determining, for each dimension, a maximum value and a minimum value across the training speech data.

3. The method of claim 1, further comprising the step of performing one or more model based adaptation techniques in accordance with the speech recognition system.

4. The method of claim 1, further comprising the step of performing one or more other feature based transformation adaptation techniques in accordance with the speech recognition system.

5. The method of claim 1, wherein the steps of computing the cumulative distribution functions comprise using a nonparametric histogram approach when sufficient adaptation data is available.

6. The method of claim 1, wherein the steps of computing the cumulative distribution functions comprise using a parametric density form when insufficient adaptation data is available.

7. The method of claim 1, wherein the nonlinear transformation mapping is applied to one of each dimension and multiple dimensions of each speech vector associated with the test speech data.

8. The method of claim 1, wherein the speech recognition system is a continuous speech recognition system.

9. The method of claim 1, wherein the cumulative distribution functions are piece-wise linear function approximations.

10. The method of claim 1, wherein the speech recognition system is associated with a telephony application.

11. Apparatus for adapting a speech recognition system to one or more acoustic conditions, the apparatus comprising:
    at least one processing device operative to:
    (i) compute cumulative distribution functions based on dimensions of speech vectors associated with training speech data provided to the speech recognition system;
    (ii) compute cumulative distribution functions based on dimensions of speech vectors associated with test speech data provided to the speech recognition system;
    (iii) compute a nonlinear transformation mapping based on the cumulative distribution functions associated with the training speech data and the cumulative distribution functions associated with the test speech data; and
    (iv) apply the nonlinear transformation mapping to speech vectors associated with the test speech data prior to recognition, wherein the speech vectors transformed in accordance with the nonlinear transformation mapping are substantially similar to speech vectors associated with the training speech data.

12. The apparatus of claim 11, wherein the operation of computing the cumulative distribution functions associated with the training speech data further comprises the operation of determining, for each dimension, a maximum value and a minimum value across the training speech data.

13. The apparatus of claim 11, wherein the at least one processing device is further operative to perform one or more model based adaptation techniques in accordance with the speech recognition system.

14. The apparatus of claim 11, wherein the at least one processing device is further operative to perform one or more other feature based transformation adaptation techniques in accordance with the speech recognition system.

15. The apparatus of claim 11, wherein the operations of computing the cumulative distribution functions comprise using a nonparametric histogram approach when sufficient adaptation data is available.

16. The apparatus of claim 11, wherein the operations of computing the cumulative distribution functions comprise using a parametric density form when insufficient adaptation data is available.

17. The apparatus of claim 11, wherein the nonlinear transformation mapping is applied to one of each dimension and multiple dimensions of each speech vector associated with the test speech data.

18. The apparatus of claim 11, wherein the speech recognition system is a continuous speech recognition system.

19. The apparatus of claim 11, wherein the cumulative distribution functions are piece-wise linear function approximations.

20. The apparatus of claim 11, wherein the speech recognition system is associated with a telephony application.

21. An article of manufacture for use in adapting a speech recognition system to one or more acoustic conditions, comprising a machine readable medium containing one or more programs which when executed implement the steps of:
    computing cumulative distribution functions based on dimensions of speech vectors associated with training speech data provided to the speech recognition system;
    computing cumulative distribution functions based on dimensions of speech vectors associated with test speech data provided to the speech recognition system;
    computing a nonlinear transformation mapping based on the cumulative distribution functions associated with the training speech data and the cumulative distribution functions associated with the test speech data; and applying the nonlinear transformation mapping to speech vectors associated with the test speech data prior to recognition, wherein the speech vectors transformed in accordance with the nonlinear transformation mapping are substantially similar to speech vectors associated with the training speech data.

22. A method of adapting a speech recognition system to one or more acoustic conditions, the method comprising the steps of:

computing cumulative distribution functions based on dimensions of speech vectors associated with training speech data provided to the speech recognition system;

computing cumulative distribution functions based on dimensions of speech vectors associated with test speech data provided to the speech recognition system;

computing a nonlinear transformation mapping based on the cumulative distribution functions associated with the training speech data and the cumulative distribution functions associated with the test speech data; and applying the nonlinear transformation mapping to speech vectors associated with the test speech data prior to recognition, wherein the speech vectors transformed in accordance with the nonlinear transformation mapping are substantially similar to speech vectors associated with the training speech data;

wherein the step of computing the cumulative distribution functions associated with the training speech data further comprises the steps of determining, for each dimension, a maximum value and a minimum value across the training speech data, and uniformly dividing a range associated with the minimum value and the maximum value into non-overlapping intervals.

23. The method of claim 22, wherein the step of computing the cumulative distribution functions associated with the training speech data further comprises the step of constructing a histogram on each interval using the training speech data.

24. A method of adapting a speech recognition system to one or more acoustic conditions, the method comprising the steps of:

computing cumulative distribution functions based on dimensions of speech vectors associated with training speech data provided to the speech recognition system;

computing cumulative distribution functions based on dimensions of speech vectors associated with test speech data provided to the speech recognition system;

computing a nonlinear transformation mapping based on the cumulative distribution functions associated with the training speech data and the cumulative distribution functions associated with the test speech data; and applying the nonlinear transformation mapping to speech vectors associated with the test speech data prior to recognition, wherein the speech vectors transformed in accordance with the nonlinear transformation mapping are substantially similar to speech vectors associated with the training speech data;

wherein the step of computing the cumulative distribution functions associated with the test speech data further comprises the step of determining, for each dimension, a maximum value and a minimum value across the test speech data.

25. The method of claim 24, wherein the step of computing the cumulative distribution functions associated with the test speech data further comprises the step of uniformly dividing a range associated with the minimum value and the maximum value into non-overlapping intervals.

26. The method of claim 25, wherein the step of computing the cumulative distribution functions associated with the test speech data further comprises the step of constructing a histogram on each interval using the test speech data.

27. A method of adapting a speech recognition system to one or more acoustic conditions, the method comprising the steps of:

computing cumulative distribution functions based on dimensions of speech vectors associated with training speech data provided to the speech recognition system;

computing cumulative distribution functions based on dimensions of speech vectors associated with test speech data provided to the speech recognition system;

computing a nonlinear transformation mapping based on the cumulative distribution functions associated with the training speech data and the cumulative distribution functions associated with the test speech data; and applying the nonlinear transformation mapping to speech vectors associated with the test speech data prior to recognition, wherein the speech vectors transformed in accordance with the nonlinear transformation mapping are substantially similar to speech vectors associated with the training speech data;

wherein the nonlinear transformation mapping is represented as $(F_T)^{-1} F_A$, where $F_T$ represents the cumulative distribution functions associated with the training speech data and $F_A$ represents the cumulative distribution functions associated with the test speech data.

28. The method of claim 27, wherein the step of computing the nonlinear transformation mapping comprises the steps of constructing a table represented as $(x_T^k, f_T^k)$ and $(x_A^k, f_A^k)$ wherein $x_T$ are training samples, $x_A$ are adaptation samples, $f_T$ are training functions, $f_A$ are adaptation functions and k refers to a $k^{th}$ increment, such that $f_A^k$ and $f_T^k$ are equally spaced values in [0, 1], and constructing a table $(x_A^k, x_T^k)$.

29. The method of claim 28, wherein, for a given value x, a binary search is conducted on $x_A^k$ to obtain the corresponding value $x_T^k$ as the nonlinear transformation mapping $\phi(x)$.

30. Apparatus for adapting a speech recognition system to one or more acoustic conditions, the apparatus comprising:

at least one processing device operative to:

(i) compute cumulative distribution functions based on dimensions of speech vectors associated with training speech data provided to the speech recognition system;

(ii) compute cumulative distribution functions based on dimensions of speech vectors associated with test speech data provided to the speech recognition system;

(iii) compute a nonlinear transformation mapping based on the cumulative distribution functions associated with the training speech data and the cumulative distribution functions associated with the test speech data; and (iv) apply the nonlinear transformation mapping to speech vectors associated with the test speech data prior to recognition, wherein the speech vectors transformed in accordance with the nonlinear transformation mapping are substantially similar to speech vectors associated with the training speech data;

wherein the operation of computing the cumulative distribution functions associated with the training speech data further comprises the operations of determining, for each dimension, a maximum value and a minimum value across the training speech data, and uniformly dividing a range associated with the minimum value and the maximum value into non-overlapping intervals.

31. The apparatus of claim 30, wherein the operation of computing the cumulative distribution functions associated with the training speech data further comprises the operation of constructing a histogram on each interval using the training speech data.

32. Apparatus for adapting a speech recognition system to one or more acoustic conditions, the apparatus comprising:
at least one processing device operative to:
(i) compute cumulative distribution functions based on dimensions of speech vectors associated with training speech data provided to the speech recognition system;
(ii) compute cumulative distribution functions based on dimensions of speech vectors associated with test speech data provided to the speech recognition system;
(iii) compute a nonlinear transformation mapping based on the cumulative distribution functions associated with the training speech data and the cumulative distribution functions associated with the test speech data; and
(iv) apply the nonlinear transformation mapping to speech vectors associated with the test speech data prior to recognition, wherein the speech vectors transformed in accordance with the nonlinear transformation mapping are substantially similar to speech vectors associated with the training speech data;
wherein the operation of computing the cumulative distribution functions associated with the test speech data further comprises the operation of determining, for each dimension, a maximum value and a minimum value across the test speech data.

33. The apparatus of claim 32, wherein the operation of computing the cumulative distribution functions associated with the test speech data further comprises the operation of uniformly dividing a range associated with the minimum value and the maximum value into non-overlapping intervals.

34. The apparatus of claim 33, wherein the operation of computing the cumulative distribution functions associated with the test speech data further comprises the operation of constructing a histogram on each interval using the test speech data.

35. Apparatus for adapting a speech recognition system to one or more acoustic conditions, the apparatus comprising:
at least one processing device operative to:
(i) compute cumulative distribution functions based on dimensions of speech vectors associated with training speech data provided to the speech recognition system;
(ii) compute cumulative distribution functions based on dimensions of speech vectors associated with test speech data provided to the speech recognition system;
(iii) compute a nonlinear transformation mapping based on the cumulative distribution functions associated with the training speech data and the cumulative distribution functions associated with the test speech data; and
(iv) apply the nonlinear transformation mapping to speech vectors associated with the test speech data prior to recognition, wherein the speech vectors transformed in accordance with the nonlinear transformation mapping are substantially similar to speech vectors associated with the training speech data;
wherein the nonlinear transformation mapping is represented as $(F_T)^{-1} F^A$, where $F_T$ represents the cumulative distribution functions associated with the training speech data and $F_A$ represents the cumulative distribution functions associated with the test speech data.

36. The apparatus of claim 35, wherein the operation of computing the nonlinear transformation mapping comprises the operations of constructing a table represented as $(x_T^k, f_T^k)$ and $(x_A^k, f_A^k)$ wherein $x_T$ are training samples, $x_A$ are adaptation samples, $f_T$ are training functions, $f_A$ are adaptation functions and k refers to a $k^{th}$ increment, such that $f_A^k$ and $f_T^k$ are equally spaced values in [0, 1], and constructing a table $(x_A^k, f_T^k)$.

37. The apparatus of claim 36, wherein, for a given value x, a binary search is conducted on $x_A^k$ to obtain the corresponding value $x_T^k$ as the nonlinear transformation mapping $\phi(x)$.

* * * * *

UNITED STATES PATENT AND TRADEMARK OFFICE
CERTIFICATE OF CORRECTION

PATENT NO.    : 6,470,314 B1
DATED         : October 22, 2002
INVENTOR(S)   : Satyanarayana Dharanipragada et al.

It is certified that error appears in the above-identified patent and that said Letters Patent is hereby corrected as shown below:

<u>Title page, Item [54] and Column 1, lines 1-4,</u>
Please change the title from "METHOD AND APPARATUS FOR RAPID ADAPT VIA CUMULATIVE DISTRIBUTION FUNCTION MATCHING FOR COITNINUOIUS SPEECH" to -- METHOD AND APPARATUS FOR RAPID ADAPTATION VIA CUMULATIVE DISTRIBUTION FUNCTION MATCHING FOR CONTINUOUS SPEECH RECOGNITION --.
Item [56], OTHER PUBLICATIONS,
Please change "Conferencc" to -- Conference --.

Signed and Sealed this

Twenty-ninth Day of April, 2003

JAMES E. ROGAN
*Director of the United States Patent and Trademark Office*